US006651303B1

(12) United States Patent
Toivanen et al.

(10) Patent No.: US 6,651,303 B1
(45) Date of Patent: Nov. 25, 2003

(54) EQUIPMENT AND METHOD FOR REPLACING A BAND-LIKE DOCTOR BLADE

(75) Inventors: Heikki Toivanen, Jyväskylä (FI); Ilkka Eskelinen, Varkaus (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/701,123

(22) PCT Filed: May 17, 1999

(86) PCT No.: PCT/FI99/00420

§ 371 (c)(1), (2), (4) Date: Nov. 20, 2000

(87) PCT Pub. No.: WO99/60207

PCT Pub. Date: May 19, 1999

(30) Foreign Application Priority Data

May 19, 1998 (FI) .............................................. 981111

(51) Int. Cl.[7] ........................ B23Q 17/00; B21B 15/00; B23P 21/00; A46B 15/00; B65H 16/00

(52) U.S. Cl. ..................... 29/407.02; 29/33 S; 29/720; 15/256.51; 242/562; 242/563.2

(58) Field of Search ......................... 29/407.01, 407.09, 29/56.5, 33 S, 720, 281.1; 226/32, 45, 33, 55; 15/256.5, 256.51, 256.53, 88; 242/562, 563.2, 564.3, 564.4; 399/284; 83/955, 651, 788–820

(56) References Cited

U.S. PATENT DOCUMENTS

| | | | | |
|---|---|---|---|---|
| 4,691,406 A | | 9/1987 | Goodnow et al. | 15/256.53 |
| 4,802,928 A | * | 2/1989 | Dunlap | 134/15 |
| 4,895,071 A | * | 1/1990 | Benton | 101/169 |
| 5,138,740 A | | 8/1992 | Goodnow et al. | 15/256.51 |
| 5,264,035 A | | 11/1993 | Beisswanger et al. | 118/126 |
| 5,782,976 A | | 7/1998 | Marziale et al. | 118/118 |

FOREIGN PATENT DOCUMENTS

| | | | |
|---|---|---|---|
| FI | 54076 | | 6/1978 |
| GB | 2253203 | * | 9/1992 |

* cited by examiner

*Primary Examiner*—John C. Hong
(74) *Attorney, Agent, or Firm*—Steinberg & Raskin, P.C.

(57) ABSTRACT

The invention relates to band-like doctor blade assembly, a doctor blade and a method in the use of the doctor blade. The doctor blade assembly includes continuous and substantially infinite doctor blade that is placed in a reel, the doctor blade is then fed into a blade holder. The blade holder includes locking devices in its connection for locking the doctor blade in the blade holder. The continuous and substantially infinite doctor blade has a plurality of edge notches formed along an edge thereof and the doctor blade is fed over a length substantially equal to the distance between the edge notches, while the notches are placed, during the operation of the doctor blade, at both ends of the blade holder and permit bending of the continuous band-like doctor blade.

20 Claims, 3 Drawing Sheets

EQUIPMENT AND METHOD FOR REPLACING A BAND-LIKE DOCTOR BLADE

FIELD OF THE INVENTION

The invention concerns an equipment for replacing a doctor blade, a doctor blade, and a method in the use of a band-like doctor blade.

BACKGROUND OF THE INVENTION

For example, from the patent publications FI 54,076 and U.S. Pat. No. 4,691,406, the use of a band-like doctor blade material is known for servicing of roll faces. Thus, it is known to transfer a used doctor blade onto a winder for the used blade, and the unused doctor blade is fed from its own reel. The prior-art equipments are mainly hydraulic, and in their case oscillation of a doctor blade has also been permitted.

In the prior art devices, however, it is a particular drawback that the contact between the doctor blade and the roll is not fully adequate, because at the edges of the holder the doctor blade is bent in an uncontrolled way, and in such a case the wear of the doctor blade is also uncontrolled, which has the further consequence that the operation of the doctor blade in the prior-art solutions is not sufficiently reliable.

OBJECTS AND SUMMARY OF THE INVENTION

In the present patent application, it is suggested that such an equipment for replacing a doctor blade is used in which the doctor blade is passed from a reel of doctor blades, preferably from a storage box for doctor blades. Thus, at one end of the roll, the equipment comprises a blade feed device, and at the opposite end of the roll a blade pulling device. Both of said devices are operated when a blade is fed from a reel of doctor blades into connection with the roll. The doctor blade is passed into a blade opening of a blade holder for a conventional doctor blade, which holder is provided on a frame beam, and the blade is locked in its position in the blade opening by means of loading hoses which operate as a blade positioning device and, at the same time, as locking means.

In accordance with the present invention, it is an essential feature of the equipment for replacing a doctor blade and of the doctor blade and of the method in the use of the doctor blade in accordance with the present invention that the doctor blade is provided with edge notches at one longitudinal edge of the doctor blade. During operation of the doctor, said notches are placed at both ends of the area of use proper of the doctor blade. The notches permit controlled and uniform bending of the doctor blade during operation. In such a case, the blade is worn uniformly. When it is desirable to change the area of operation of said doctor blade, doctor blade is fed from the reel of doctor blades so that the edge notch at the outlet side of the doctor blade is placed at the end of the area of operation on the doctor blade holder, and the new edge notch is transferred in such a way into connection with the blade that it is placed at the inlet end of the doctor blade holder, as viewed in the feed direction $L_1$. Thus, the doctor blade is fed periodically always over the length of one distance $E_1$ between notches.

From the blade pulling device the used doctor blade is fed further to the winding device for used blade.

The blade solution in accordance with the invention mentioned above makes it possible to provide an equipment of an entirely novel type for replacing a doctor blade. In accordance with the invention, a band-like doctor blade can be fed directly out of a storage package for doctor blades from a reel, and said feed is carried out periodically always over the length of one distance $E_1$ between notches. Thus, a blade in accordance with the invention is provided with notches at the side or edge, which notches permit satisfactory operation of the blade in accordance with the invention. In accordance with the invention, it is possible to use existing frame beams and doctor blade holders of a doctor equipment. In such a case, the blade is fed through the blade opening on the holder, at which time the blade loading members have been released. As the loading means, it is possible to use ordinary pneumatic hoses or equivalent. Also, other loading means can be used in order to lock the doctor blade in its holder.

The equipment for replacing a doctor blade, the doctor blade, and the method in the use of a band-like doctor blade in accordance with the invention are characterized in what is stated in the patent claims.

BRIEF DESCRIPTION OF THE DRAWINGS

The invention will be described in the following with reference to some preferred embodiments of the invention illustrated in the figures in the accompanying drawings, the invention being, yet, not supposed to be confined to said embodiments alone.

DETAILED DESCRIPTION OF THE INVENTION

Figure 1A:
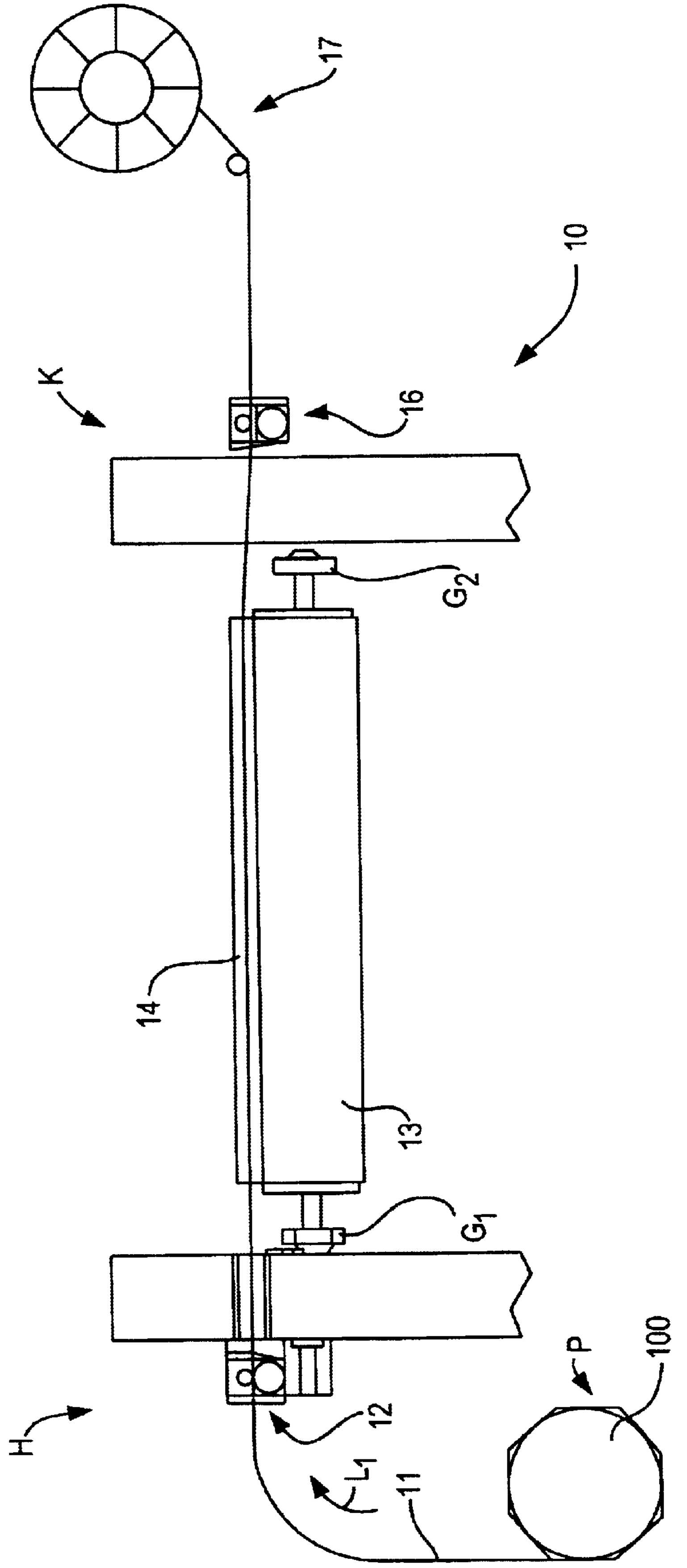
FIG. 1A is a schematic illustration of an equipment in accordance with the invention as viewed in the machine direction.

FIG. 1A shows an equipment 10 in accordance with the invention for replacing a doctor blade. The doctor blade 11 is placed on a reel 100 in a storage box P, from which it is taken as a band to a feed device 12 and passed through the feed device 12 and through a blade opening provided in the blade holder 14 provided on the doctor blade frame 13 further to a pulling device 16 and through it to a winding device 17 for used doctor blade.

In the figure, the direction of feed of the doctor blade 11 from the blade feed device 12 through the blade holder 14 to the pulling device 16 is denoted with the arrow $L_1$. Thus, the doctor blade is fed from the tending side H of the machine to the driving side K of the machine along with the face T' of the roll T. Between the frame of the doctor and the blade holder, there are means $J_1$,$J_2$, favourably loading hoses, by whose means the blade holder 14 provided on the frame can be pivoted so that the doctor blade 11 fitted in the blade holder reaches contact with the roll T face T'. In this connection, the blade 11 is also kept locked in its blade holder 14.

The frame 13 of the doctor blade, i.e. the doctor frame, can be oscillated by means of a cylinder device 15 (arrow $S_1$). By means of the loading hoses $J_1$,$J_2$, which are loaded by a pressure of a medium, the blade can be pressed so that the loading hose presses the doctor blade 11 into contact with the faces of the holder 14 and keeps the blade locked in the holder.

Figure 1B:
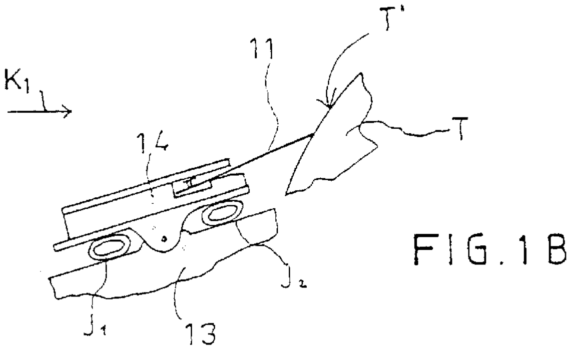
FIG. 1B is a side view of a doctor blade.
Figure 1C:
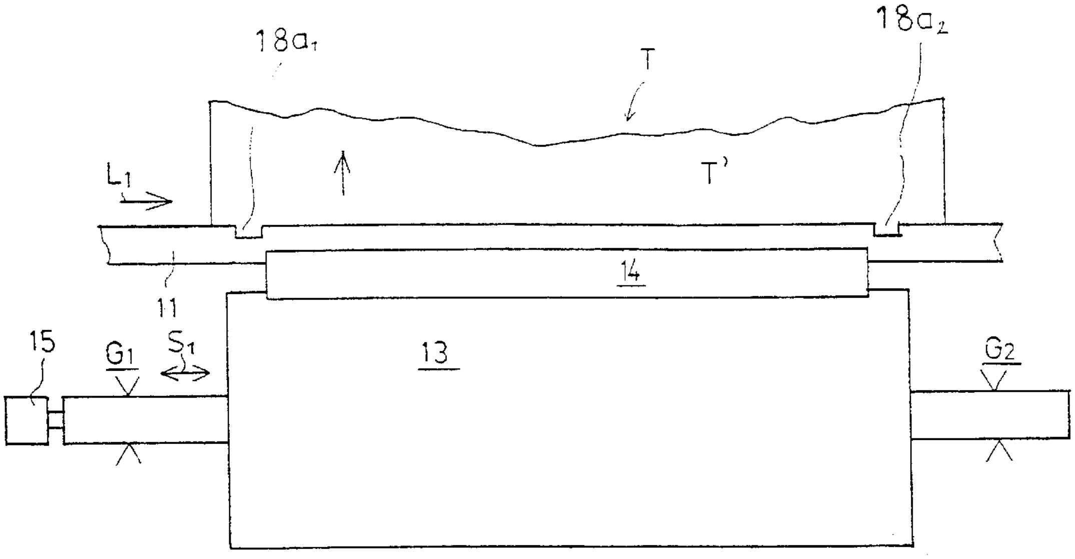
FIG. 1C shows the equipment of FIG. 1B as viewed in the direction of the arrow $k_1$ in FIG. 1B.

FIG. 1B is a side view of the blade holder, and FIG. 1C shows the equipment as viewed in the direction of the arrow $k_1$ in FIG. 1B. The holder 14 of the doctor blade 11 is fitted on the doctor frame 13, which has been mounted by means of bearing means $G_1$,$G_2$. In an oscillating movement, the whole doctor frame 13 is displaced along a linear path (arrow $S_1$). The equipment 10 in accordance with the invention for replacing a doctor blade 11 can be used in connection with existing doctor frames 13 and their blade holders 14. The doctor frames 13 can be provided with oscillating devices 15, in which case, in a solution of equipment in accordance with the invention, the doctor blade frame 13 and, thus, the doctor blade 11 can be oscillated in the lateral direction of the roll T, in which connection, for example, a movement of oscillation of 100 mm is permitted so that the blade feed device and the blade pulling device are coupled free. A controlled bending of the blade 11 is permitted by notches 18$a_1$,18$a_2$ . . . formed along the edge of the blade 11 and in this way a movement of oscillation is also permitted.

Figure 2A:
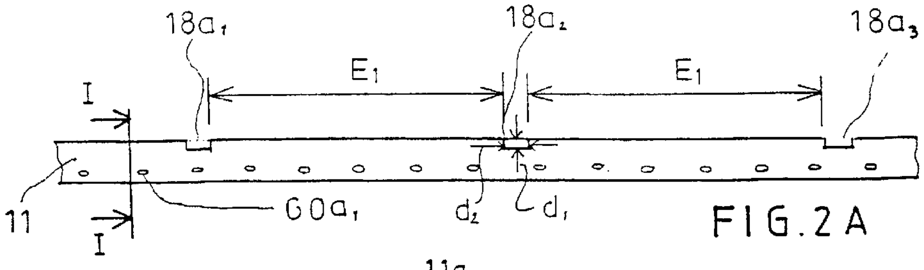
FIG. 2A shows a doctor blade in accordance with the invention.

FIG. 2A illustrates a blade 11 in accordance with the invention. The blade 11 is provided with notches 18$a_1$,18$a_2$. . . at the edge, and the distance between said notches, i.e. the gap $E_1$ between the notches, is equal to the length of the roll T. In such a case, the notches 18$a_1$,18$a_2$. . . at the edge can be fitted outside the two lateral edges of the blade holder. The notches at the edge permit bending of the blade 11 and, thus, uniform wear.

The notches 18$a_1$, and 18$a_2$ at the edge are preferably of rectangular section, and their depth, i.e. height,=$d_1$, and their width=$d_2$, and the gap $E_1$ between the notches is preferably equal to the length of the roll T, i.e. preferably the length over which the doctor blade must be in contact with the roll face T' in view of its servicing.

The gap $E_1$ between the notches is preferably in a range 1000 mm . . . 15,000 mm. The depth $d_1$ of each notch 18$a_1$,18$a_2$. . . at the edge is preferably in a range 5 mm . . . 100 mm, and the width $d_2$ of each notch 18$a_1$,18$a_2$. . . at the edge is preferably in a range 5 mm . . . 1200 mm, and optimally in a range 100 mm . . . 1000 mm.

Figure 2B:
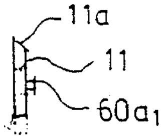
FIG. 2B is a sectional view of a doctor blade taken along the line I—I in FIG. 2A.

FIG. 2B shows the doctor blade 11 as a sectional view taken along the line I—I in FIG. 2A. In the embodiment shown in the figure, the doctor blade 11 is a web-like, oblong material to be unwound from a reel, which material comprises a blade edge 11$a$ which is placed against the roll face and fitted at an oblique angle against the roll face. Further, on the top face of the doctor blade 11, there are pins 60$a_1$, 60$a_2$ . . . , by whose means it is prevented that the doctor blade should fall away from the gap in the blade holder when the doctor blade is not loaded and when the blade is in a position in which it can fall away from the blade space of the blade holder by the effect of gravity.

Figure 3A:
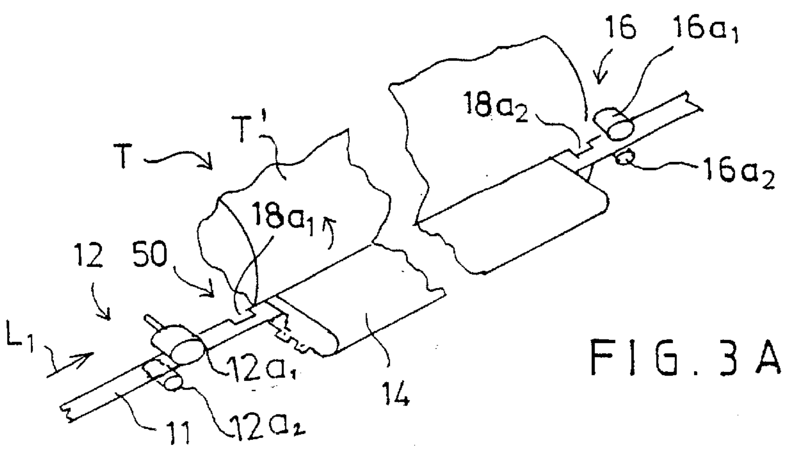
FIG. 3A is an axonometric view illustrating the feed of a doctor blade in accordance with the invention while making use of a photocell.

FIG. 3A shows an embodiment of the invention in which the equipment is controlled by means of a system of photocells. Further, for the feed of the doctor blade 11, a feed device 12 and a pulling device 16 are used, which comprise friction wheels 12$a_1$,12$a_2$;16$a_1$,16$a_2$. Thus, the feed device and the pulling device form a friction equipment, in the way shown in FIG. 3A, for feeding the doctor blade 11 in the feed direction $L_1$. In the way shown in FIG. 3A, when the edge notch 18$a_1$ at the blade 11 reaches the location of the photocell device 50, the feed is stopped. The photocell device 50 comprises a source of light 50$a_1$ and a detector 50$a_2$ that receives light. In such a case, the notches 18$a_1$ and 18$a_2$ at the, edge are placed at the ends H and K of the blade holder 14 of the doctor blade 11. The blade is always fed as a length equal to the gap $E_1$ between the edge notches 18$a_1$ and 18$a_2$, i.e. as a length over which the doctor blade 11 is in contact with the roll T face T'. The friction wheels 12$a_1$ and 16$a_1$ are rotated by electric motors. The backup wheels 12$a_2$ and 16$a_2$ can be freely revolving.

Figure 3B:
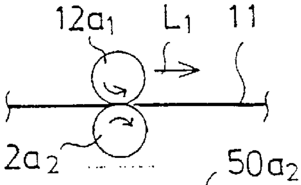
FIG. 3B is a side view of a feed device 12.

FIG. 3B illustrates the construction of the feed device 12. The feed device 12 comprises feed wheels 12$a_1$,12$a_2$, preferably friction wheels, of which preferably the friction wheel 12$a_1$ is provided with drive. The drive is taken favourably from an electric motor. The oblong doctor blade band 11 is passed through the nip between the wheels 12$a_1$,12$a_2$ and is fed forwards by means of the wheel 12$a_1$. The feed direction is indicated by the arrow $L_1$. The gap $E_1$ between notches, i.e. the distance between adjacent notches 18$a_1$,18$a_2$. . . at the edge, is in a range 1000 mm . . . 15,000 mm, depending on the length of the roll.

Figure 3C:
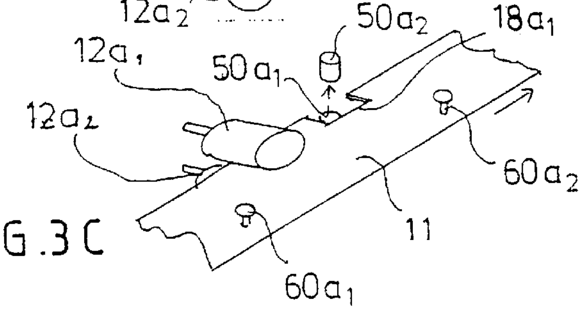
FIG. 3C shows an embodiment in which the position of the edge notch is read from the location of the edge notch by means of a photocell device $\mathbf{50}a_1$,$\mathbf{50}a_2$.

FIG. 3C is a separate illustration showing the determination of the position of the doctor blade 11 by means of a photocell device 50. The photocell device comprises arrangements of equipment fitted above and below the blade 11, i.e. a transmitter of a signal, preferably a source of light 50$a_1$ which emits light, and a detector 50$a_2$ which detects light, in the present case preferably a photocell. When the notch 18$a_1$ at the edge of the blade 11 has reached the location of the photocell device, said situation is detected by means of the detector 50$a_2$, and the feed of the blade 11 is stopped. Then, the detector 50$a_2$ receives a signal, preferably a beam of light, from the signal transmitter 50$a_1$, preferably a source of light. The information from the detector 50$a_2$ is transferred to the central unit 200, as is illustrated in FIG. 4.

Figure 3D:
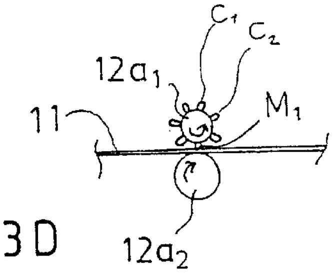
FIG. 3D shows a second embodiment of the invention, in which the feed device comprises a gearwheel, a toothed wheel, or equivalent.

FIG. 3D shows a second embodiment, in which the doctor blade is provided with holes $M_1$,$M_2$,$M_3$ . . . , which are placed at regular distances from one another and which operate as grasping holes for the blade 11 feed device 12 and for the blade pulling device 16, which devices comprise teeth on the drive wheels 12$a_1$,16$a_1$, the teeth $c_1$,$c_2$ . . . in the toothings entering into said holes $M_1$,$M_2$. . . and operating as blade 11 feeders. A solution of said sort also permits reliable calculation of the blade length that has been fed, because the blade 11 feed device 12 can comprise a detector device on the drive wheel 12$a_1$, by means of which detector device the distance of blade that has been fed can be calculated from the number of revolutions of the drive wheel of the feed device 12.

Figure 3E:
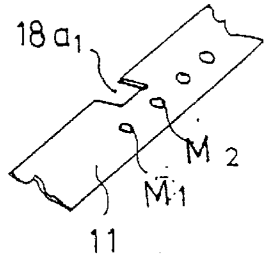
FIG. 3E shows an embodiment of a doctor blade related to the embodiment shown in FIG. 3D, in which embodiment the doctor blade is provided with perforations $M_1$, $M_2$ . . . for engagement with the teeth.

FIG. 3E is a separate illustration showing an embodiment of the invention which is related to FIG. 3D, i.e. to the toothed-wheel drive. In the embodiment shown in FIG. 3E, the lateral area of the band 11 is provided with holes $M_1$,$M_2$ which are grasped by the teeth on the toothed wheel 12$a_1$ so as to feed the doctor blade 11 in the feed direction.

Figure 4:
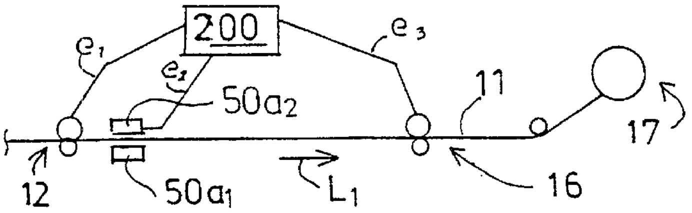
FIG. 4 is a schematic illustration of a solution of equipment in accordance with the invention.

FIG. 4 is a schematic illustration of a solution of equipment in accordance with the invention. The central unit 200 comprises data transfer buses $e_1$,$e_2$ . . . passing to the blade feed device 12 and to the blade pulling device 16 and to the winder 17 of used blade 11.

The notch gap $E_1$ between the edge notches 18$a_1$,18$a_2$ can be favourably programmed in advance in the central unit 200, in which case the central unit 200 is provided with a counter, by whose means it sums the blade length that has been fed and compares it with the blade length provided on the reel and notifies the operating personnel, by means of a display monitor or otherwise, of the necessity of replacing a new reel of doctor blades or of the total blade length still present on the reel.

The invention is described above referring merely to the advantageous embodiment examples thereof, to the details of which the invention is not, however, intended to be exclusively restricted. A number of modifications and variations are conceivable within the scope of the inventive idea of the claims below. As such, the examples provided above are not meant to be exclusive and many other variations of the present invention would be obvious to those skilled in the art, and are contemplated to be within the scope of the appended claims.

What is claimed is:

1. A doctor blade assembly comprising:

a continuous and substantially infinite doctor blade (11);

a real (100), said reel (100) structured and arranged for storing the continuous and substantially infinite doctor blade (11);

a feeding device (12), said feeding device (12) being structured and arranged for unwinding said continuous and substantially infinite doctor blade (11) from said reel (100);

a blade holder (14) structured and arranged to receive said doctor blade (11) from said feeding device(12); and wherein the doctor blade (11) includes a plurality of notches (18$a_1$,18$a_2$ . . . ) formed along an edge thereof, the doctor blade being fed over a length equal to a distance ($E_1$) between the notches, while the notches (18$a_1$,18$a_2$) are placed, during operation of the doctor blade (11), at both ends of the blade holder (14) and permit bending of the doctor blade (11).

2. The doctor blade assembly as claimed in claim 1, wherein the equipment further comprises:

a doctor blade feed device (12); and a pulling device (16), said doctor blade feed device (12) and said pulling device (16) being structured and arranged for feeding the doctor blade (11) in a feed direction ($L_1$) from a doctor blade storage box (P) to a winding device (17).

3. The doctor blade assembly as claimed in claim 2, wherein the doctor blade (11), the feed device (12) and the pulling device (16), further comprise:

friction operated drive wheels which are brought into engagement with a face of the doctor blade (11) in order to feed the blade in the feed direction ($L_1$).

4. The doctor blade assembly as claimed in claim 1, further comprising:

a signal generating source (50$a_1$) for generating a signal and a signal detector (50$a_2$) for detecting said signal generated by said signal generating source, said signal generating source and said detector being located along the edge of the doctor blade, wherein said signal is detected by the detector (50$a_2$) when the plurality of notches (18$a_1$,18$a_2$ . . . ) of the doctor blade (11) have reached a location for the signal generating source (50$a_1$) at which time the unwinding of the doctor blade (11) is stopped, wherein the signal generating source emits a beam of light and wherein the detector is a photocell (50$a_2$) for receiving said beam of light.

5. The doctor blade assembly as claimed in claim 3, wherein the drive wheels of the doctor blade feed device (12) and of the pulling device (16) operate electrically.

6. A band-like doctor blade assembly comprising:

a continuous and substantially infinite band-like doctor blade (11); and wherein the continuous and substantially infinite band-like doctor blade (11); has a plurality of edge notches (18$a_1$, 18$a_2$ . . . ) formed along an edge of the blade (11), a distance between each one of the plurality of notches (18$a_1$, 18$a_2$ . . . ) being substantially equal to a length over which the continuous and substantially infinite band-like doctor blade (11) is in contact with a roll face (T') of a roll (T) to be serviced.

7. The band-like doctor blade assembly as claimed in claim 6, wherein the distance ($E_1$) between the edge notches (18$a_1$, 18$a_2$ . . . ) is in a range of about 1000 mm to about 15,000 mm.

8. The band-like doctor blade assembly as claimed in claim 6, wherein each one of the plurality of edge notches being rectangular and having a depth ($d_1$) in arrange of about 5 mm to about 100 mm, and having a width ($d_2$) in a range of about 5 mm to about 1200 mm.

9. The band-like doctor blade assembly as claimed in claim 8, wherein the width ($d_2$) of each one of said plurality of notches is in a range of about 100 mm to about 1000 mm.

10. The band-like doctor blade assembly as claimed in claim 6, further comprising:

a plurality of guide pins (60$a_1$, 60$a_2$ . . . ) integral with a face of the doctor blade, said guide pins being structured and arranged to keep the doctor blade (11) in a blade holder (14).

11. A method in the use of a band-like doctor blade (11), comprising the steps of:

providing a continuous and substantially infinite band-like doctor blade (11);

feeding the doctor blade (11) from a reel (100) into a blade holder (14) wherein the doctor blade (11) comprises edge notches (18$a_1$, 18$a_2$ . . . ) formed along an edge thereof and a distance ($E_1$) between the edge notches being substantially equal to a length over which the doctor blade is fed in a feed direction ($L_1$).

12. The method as claimed in claim 11, further comprising the step of:

feeding the doctor blade (11) in the feed direction ($L_1$) from the reel (100) out of a doctor blade (11) storage box (P).

13. The method as claimed in claim 11 further comprising the step of:

winding the doctor blade (11) by means of a winding device (17) after the doctor blade (11) has been used.

14. The method as claimed in claim 11, further comprising the steps of: providing a detector (50$a_2$) in a lateral area of the doctor blade, detecting the edge notches (18$a_1$, or 18$a_2$ . . . ) provided at the edge of the doctor blade (11) by the detector (50$a_2$) and reporting said detecting to a central unit (200), in which case the feed of the doctor blade (11) is stopped.

15. The method as claimed in claim 14, further comprising the steps of:

generating a beam of light from a source of light (50$a_1$) at the edge notches (18$a_1$,18$a_2$ . . . ), and detecting the beam of light by the detector (50$a_2$).

16. The method as claimed in claim 11, further comprising the step of:

transferring the doctor blade (11) by means of a friction equipment (12$a_1$, 12$a_2$; 16$a_1$, 16$a_2$).

17. A band-like doctor blade assembly, comprising:

a continuous and substantially infinite band-like doctor blade placed in a reel, said doctor blade having a plurality of notches formed along an edge thereof, wherein said doctor blade is fed over a length equal to a distance between said notches formed along said edge of said doctor blade, such that, during an operation of said doctor blade, a first notch is located before a blade holder and a second successive notch is located after said blade holder, thereby permitting bending of said continuous and substantially infinite band-like doctor blade.

18. A doctor blade, comprising:

a continuous and substantially infinite blade having an elongated body, said continuous blade including a plurality of edge notches formed along an edge of said blade, wherein said notches are structured and arranged such that a length between said notches is substantially equal to a length of contact between said continuous blade and a face of a roll when said roll is serviced by said continuous blade.

19. A method for the use of a band-like doctor blade comprising the steps of:

providing a continuous and substantially infinite band-like doctor blade; and feeding said doctor blade, from a reel on which said doctor blade is retained, into a blade holder, wherein said doctor blade comprises a plurality of edge notches formed along an edge thereof wherein a distance between successive edge notches is substantially equal to a length over which said doctor blade is fed in a feed direction.

20. A method for the use of a continuous doctor blade, comprising the steps of:

providing a continuous and substantially infinite doctor blade, said doctor blade having a plurality of edge notches formed along an edge of said doctor blade;

arranging a portion of said continuous and substantially infinite doctor blade in a blade holder, wherein one of said plurality of edge notches is located before said blade holder and another one of said plurality of edge notches is located after said blade holder, servicing a face of a roll with said continuous and substantially infinite doctor blade, wherein a length between said edge notches being substantially equal to a length of contact between said continuous and substantially infinite doctor blade and the face of the roll;

feeding said portion of said continuous and substantially infinite doctor blade arranged in said blade holder from said blade holder to a winding device; and arranging a new portion of said continuous and substantially infinite doctor blade in said blade bolder, wherein said new portion of said continuous and substantially infinite doctor blade has one of said plurality of edge notches located before said blade holder and another one of said plurality of edge notches located after said blade holder.

* * * * *

UNITED STATES PATENT AND TRADEMARK OFFICE

CERTIFICATE OF CORRECTION

PATENT NO. : 6,651,303 B1
DATED : November 25, 2003
INVENTOR(S) : Toivanen et al.

It is certified that error appears in the above-identified patent and that said Letters Patent is hereby corrected as shown below:

Title page,
Item [87], PCT Publication Date, should read -- November 25, 1999 --.

Signed and Sealed this

Sixth Day of April, 2004

JON W. DUDAS
*Acting Director of the United States Patent and Trademark Office*